United States Patent [19]

Ishida

[11] 4,288,150
[45] Sep. 8, 1981

[54] DIAPHRAGM CONTROL DEVICE FOR CAMERAS

[75] Inventor: Tokuji Ishida, Daito, Japan

[73] Assignee: Minolta Camera Kabushiki Kaisha, Osaka, Japan

[21] Appl. No.: 201,312

[22] Filed: Oct. 27, 1980

[30] Foreign Application Priority Data

Oct. 26, 1979 [JP] Japan .................................. 54/139182

[51] Int. Cl.³ ............................................. G03B 7/097
[52] U.S. Cl. .................................. 354/23 D; 354/42; 354/30; 352/141; 250/214 P
[58] Field of Search .................... 354/42, 23 D, 40–45, 354/29, 30, 38, 60 R; 352/141; 250/214 P; 356/225

[56] References Cited

U.S. PATENT DOCUMENTS

| | | | |
|---|---|---|---|
| 3,792,485 | 2/1974 | Strauss | 354/41 X |
| 4,104,656 | 8/1978 | Strauss | 354/42 X |
| 4,196,989 | 4/1980 | Toyoda et al. | 354/42 X |

Primary Examiner—L. T. Hix
Assistant Examiner—Stafford D. Schreyer
Attorney, Agent, or Firm—Watson, Cole, Grindle & Watson

[57] ABSTRACT

A diaphragm control device of the type which performs TTL light measurement while stopping-down a diaphragm is constructed to automatically determine the diaphragm aperture by comparing an approximate signal with a reference signal to minimize the diaphragm aperture determination error caused when timewise variations are involved in the scene brightness. The approximate signal is generated by various circuits on the basis of a light measurement signal obtained by the TTL light measurement. The approximate signal varies approximately with the change in the diaphragm aperture due to the stopping-down operation of the diaphragm and coincides with the light measurement signal when no timewise variations are involved in the scene brightness.

12 Claims, 11 Drawing Figures

DIAPHRAGM CONTROL DEVICE FOR CAMERAS

BACKGROUND OF THE INVENTION

1. Field of the Invention

The present invention relates to a diaphragm control device for use in a camera which performs TTL (through-the-lens) light measurement while stopping down a diaphragm, and more particularly it pertains to a type of diaphragm control device which determines a diaphragm aperture size by suspending the diaphragm stopping-down operation when a light measuring value indicates its predetermined relationship with a preset value.

2. The Prior Art

Diaphragm control devices for cameras which perform TTL light measurement while stopping down a diaphragm are of course well known. The operation of such a known device is represented in FIG. 1 of the attached drawings. In FIG. 1 the dashed-dot line Vo shows the changes in the TTL light measuring value when the diaphragm is stopped down from the fully open aperture to the minimum aperture size, with the scene brightness remaining unvaried. In this case, the changes in Vo are, in other words, those in the aperture size, which can therefore be determined when the diaphragm stopping-down operation is suspended at point a, at which time Vo reaches predetermined value $V_t$.

However, when a scene is placed under illumination, for example, using AC light, scene brightness varies timewise in accordance with the changes in the illuminous source light. In such situations, the changes in the TTL light measuring value caused by the diaphragm stopping-down operation are as shown by broken line $V_1$ in FIG. 1 (wherein the means value of $V_1$ is equal to Vo). It can be seen, for example, that the TTL light measuring value $V_1$ may reach a level of reference signal $V_t$ at point b in FIG. 1, at which time the diaphragm stopping-down operation will be suspended. Accordingly, the diaphragm will unfortunately be stopped down only up to the aperture size corresponding to point c in FIG. 1, whereby the actually determined aperture size will be left larger than the aperture size which would be appropriate for the scene brightness.

In addition, it should be noted that cutting off the AC component of a light measuring signal by means of a low-pass filter or the like would result in the cut-off of even signal changes due to the diaphragm stopping-down operation, and thus the diaphragm control device will not operate properly at all.

It is, accordingly, an object of the present invention to provide a diaphragm control device of the above-described type which is improved insofar as it can automatically determine the diaphragm aperture with a minimum error even when alternative fluctuation components are involved in the scene brightness.

SUMMARY OF THE INVENTION

According to the present invention, a diaphragm control device is provided with an approximate signal generating circuit which, on the basis of a light measurement signal obtained by a TTL light measurement, will generate an approximate signal which varies approximately with the change in the diaphragm aperture due to the stopping-down operation of a diaphragm and which will coincide with the light measurement signal when no timewise variations are involved in the scene brightness. During the stopping-down operation of the diaphragm, stopping-down stopping or suspending means compares the approximate signal with a reference signal and stops or suspends the stopping-down operation of the diaphragm when the comparison indicates that a given relationship is achieved between the approximate signal and the reference signal.

Further objects and features of the present invention will become more apparent from a review of the following description taken in connection with the accompanying drawings.

DETAILED DESCRIPTION OF THE PREFERRED EMBODIMENTS

FIGS. 2, 4, 6, 8 and 10 show five different embodiments of diaphragm control devices constructed in accordance with the present invention.

Figure 2:
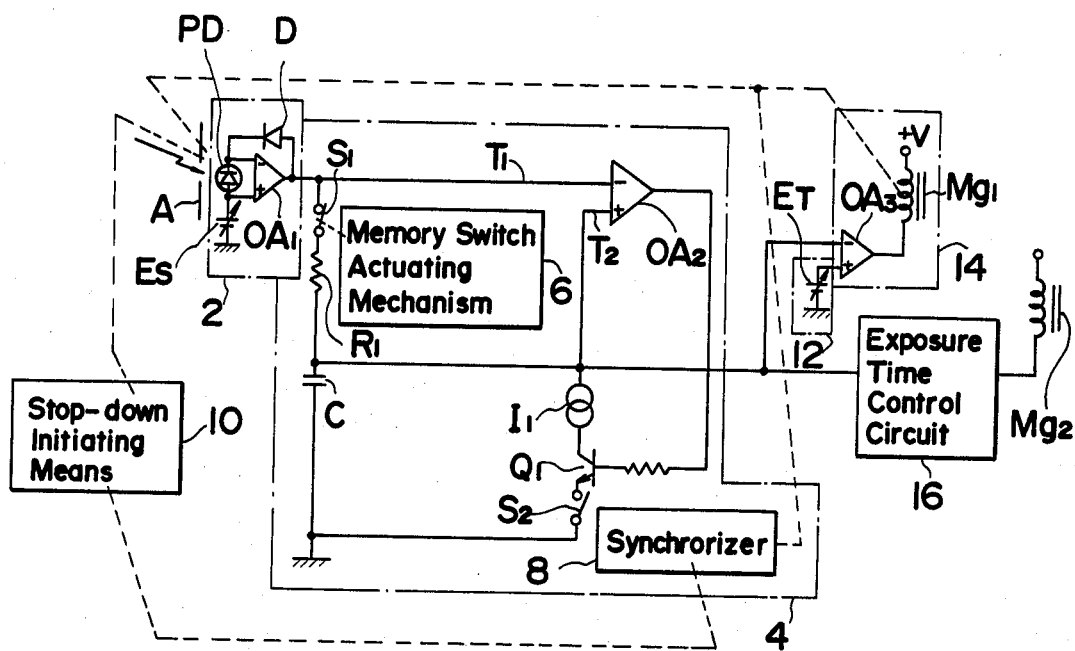
FIG. 2 shows a circuit diagram of a first embodiment of the present invention.

Referring first to FIG. 2, which shows a circuit diagram of a first embodiment of the present invention that is used in a single-lens reflex camera, a light measuring circuit 2 is provided which measures by a TTL light measuring system scene light passing through diaphragm aperture A. Light-measuring circuit 2 itself comprises light receiving element PD, potential source ES (for generating a potential corresponding to a preset film sensitivity), operational amplifier $OA_1$ and logarithmic compression diode D. Generated from operational amplifier $OA_1$ is therefore a value equal to the sum of a potential corresponding to a logarithmic compression of the amount of incident light BV-AV, and a potential corresponding to a preset film sensitivity (SV). That is, the output represents a potential corresponding to shutter speed TV for a diaphragm aperture when scene light measurement is performed. BV, AV, SV and TV should be noted to represent a luminance value, aperture value, film sensitivity and shutter speed, respectively, according to the APEX notation.

Approximate signal generating circuit 4 generates, in accordance with a signal from light measuring circuit 2, an approximate signal which varies approximately with the change in aperture size due to the diaphragm stopping-down operation. In approximate signal generating circuit 4, resistor $R_1$ and capacitor C together constitute a smoothing circuit. Memory switch $S_1$, which is normally closed, is controlled by memory switch actuating mechanism 6 so that it may be opened before light measuring becomes impossible after the determination of a diaphragm aperture (before the mirror of a single-lens reflex camera is lifted, for example, when a light receiving element is provided on a pentagonal prism). Synchronizing switch $S_2$ is controlled by synchronizer 8, which closes synchronizing switch $S_2$ in synchronization with the start of a diaphragm stopping-down operation in response to a signal from diaphragm stop-down initiating means 10, and at the same time, opens synchronizing swtich $S_2$ again after the lapse of a predetermined time longer than that required for the diaphragm to be stopped down to the minimum aperture. A constant current circuit is labeled $I_1$. Transistor $Q_1$ is controlled by comparator $OA_2$ and is turned on when the voltage level at terminal $T_1$ in FIG. 2 goes below the voltage level at terminal $T_2$.

Figure 3:
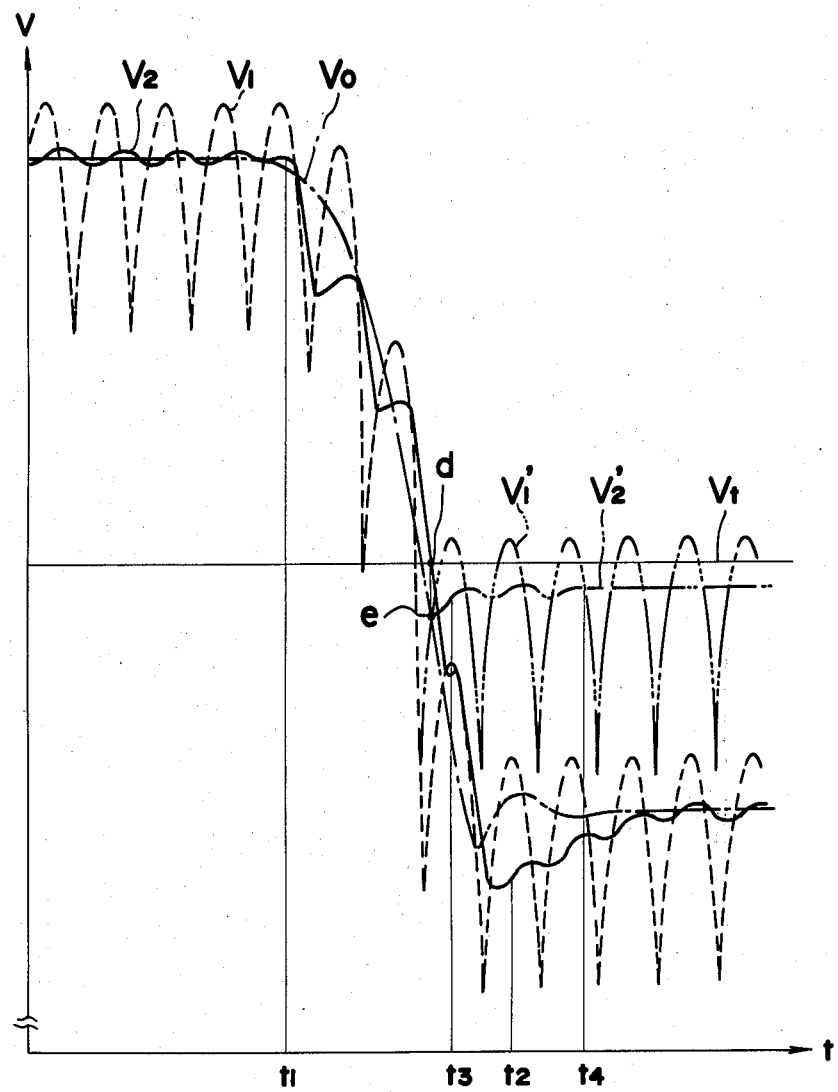
FIG. 3 shows graphically the operative functioning of the first invention embodiment shown in FIG. 2.

FIG. 3 represents the operation of the approximate signal generating circuit, wherein broken line $V_1$ represents the output voltage of light measuring circuit 2 at line $T_1$ in FIG. 2, and solid line $V_2$ represents the output voltage (approximate signal) of approximate signal generating circuit at line $T_2$ in FIG. 2.

Assume that memory switch $S_1$ is normally closed. When the timewise mean value of scene brightness becomes constant, output $V_2$ at line $T_2$ takes a smoothed value of output $V_1$ at line $T_1$ as shown in FIG. 3, and remains almost constant in the vicinity of the mean value $V_o$ up to time $t_1$ because synchronizing switch $S_2$ is opened and the diaphragm aperture is kept fully open up to time $t_1$.

When synchronizing switch $S_2$ is closed at time $t_1$ in synchronization with the start of the diaphragm stopping-down operation (after the lapse of a predetermined time subsequent to the depression of the release button), comparator $OA_2$, constant-current circuit $I_1$ and transistor $Q_1$ are made operative. (When a predetermined lag is given between time $t_1$ and the change initiating time of the diaphragm aperture, it is also said that "synchronizing switch $S_2$ is closed in synchronization with the start of the diaphragm stopping-down operation".) As is apparent from FIG. 3, only when output $V_1$ at line $T_1$ is lower than output $V_2$ at line $T_2$ after time $t_1$ will transistor $Q_1$ be turned on under the control of comparator $OA_2$, causing capacitor C to be rapidly discharged through constant-current circuit $I_1$. Thus, with the smoothing circuit consisting of resistor $R_1$ and capacitor C alone, $V_2$ cannot follow the rapid drop of $V_1$ level after the start of diaphragm stopping-down operation. However, comparator $OA_2$, constant-current circuit $I_1$, transistor $Q_1$ and synchronizing switch $S_2$ serve to increase the following speed of $V_2$ only in the direction in which $V_1$ decreases. As a result, the changes in $V_2$ are more approximate to the changes in diaphragm aperture Vo than those in $V_1$, as is clear from FIG. 3.

It is to be understood that synchronizing switch $S_2$ is re-opened at time $t_2$ after the lapse of a predetermined time longer than the time required for the diaphragm to be stopped down to the minimum aperture from time $t_1$. Thus, after time $t_2$, as is clear from FIG. 3, $V_2$ follows $V_1$ in a similar manner to that before time $t_1$, and since the diaphragm has been stopped at the minimum diaphragm aperture, $V_2$ is finally settled almost at a constant value in the vicinity of the mean value Vo.

According to the present invention, a comparison is made between approximate signal $V_2$ and reference signal $V_f$. In greater detail, with the embodiment of FIG. 2, reference signal generating circuit 12 generates reference signal $V_f$ (corresponding to preset shutter speed TV) through potential source ET. Reference signal $V_f$ and approximate signal $V_2$ at line $T_2$ are compared by comparator $OA_3$ inside diaphragm stopping-down operation stopping means 14. When the voltage level of $V_2$ becomes below that of $V_f$ (at point d in FIG. 3), a signal is generated from comparator $OA_3$ to actuate electromagnet $Mg_1$ which stops diaphragm stopping-down operation. At this time, the diaphragm is actually stopped down to a position corresponding to point e in FIG. 3. However, an error between points d and e in FIG. 3 is smaller by approximate signal $V_2$ being approximated to diaphragm aperture change $V_o$ than that between points b and c in FIG. 1.

Synchronizer 8 is also designed to open synchronizing switch $S_2$ at time $t_3$ immediately after the voltage level of $V_2$ becomes below that of $V_f$, in response to the action of electromagnetic $Mg_1$. Consequently, when the diaphragm stopping-down operation is suspended before the diaphragm is stopped down to the minimum aperture, output $V_1$ of light measuring circuit 2 changes as shown by three-point chained line $V_1'$, while output $V_2$ of approximate signal generating circuit 4 changes as shown by two-point chained line $V_2'$. That is, since comparator $OA_2$, constant-current circuit $I_1$ and transistor $Q_1$ do not function after time $t_3$, $V_2$ remains almost constant, taking a smoothed value of $V_1'$ under the same condition likewise to before time $t_1$. This value corresponds to shutter speed TV for a diaphragm aperture stopped down to the position corresponding to point e in FIG. 3. Therefore, when memory switch $S_1$ is opened by mechanism 6 at time $t_4$, $V_2'$ is thereafter fixed at a constant value, on the basis of which exposure time control circuit 16 and shutter closing electromagnet $Mg_2$ controls exposure time. Thus, capacitor C of the approximate signal generating circuit is also used as a memory capacitor.

Figure 1:
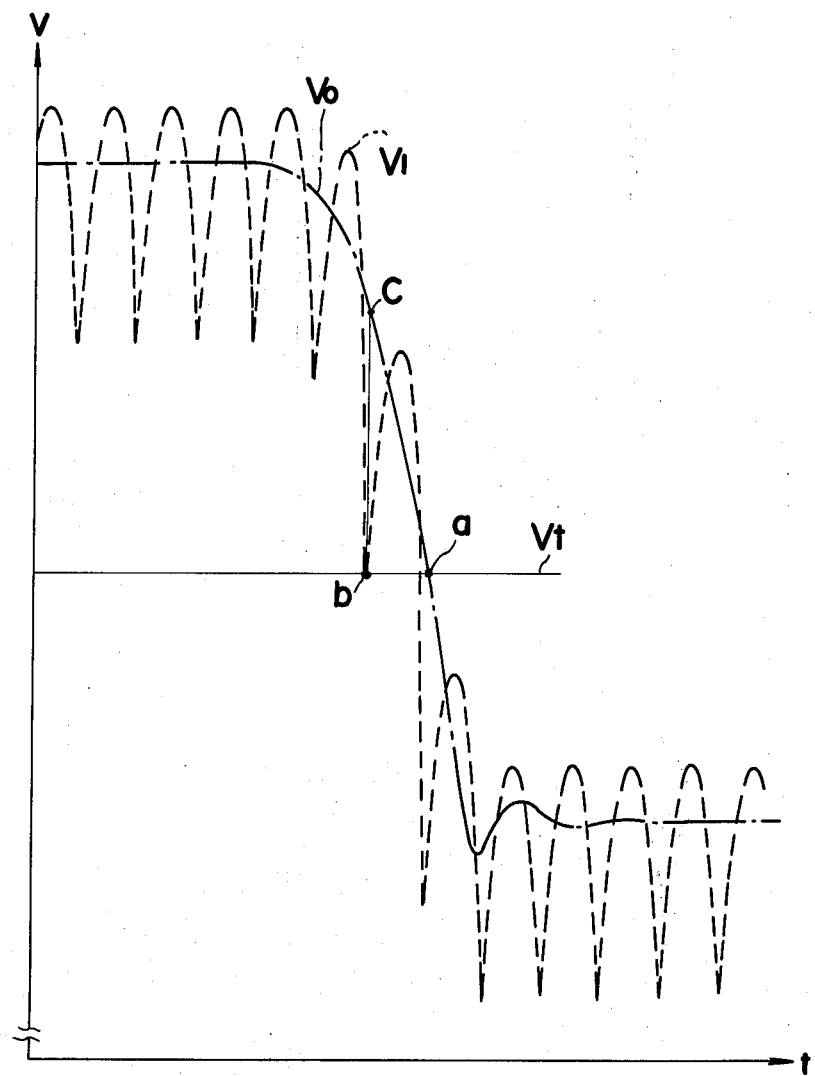
FIG. 1 shows graphically the operative functioning of a prior art diaphragm control device.

Explanation has thus been given for the case where scene brightness changes with the variations in the light of an AC light source as shown by $V_1$ in FIG. 1.

It is needless to say, however, that approximate signal $V_2$ is coincident with the changes in Vo when such variation components are not included in the scene brightness as shown by Vo in FIG. 1.

Figure 4:
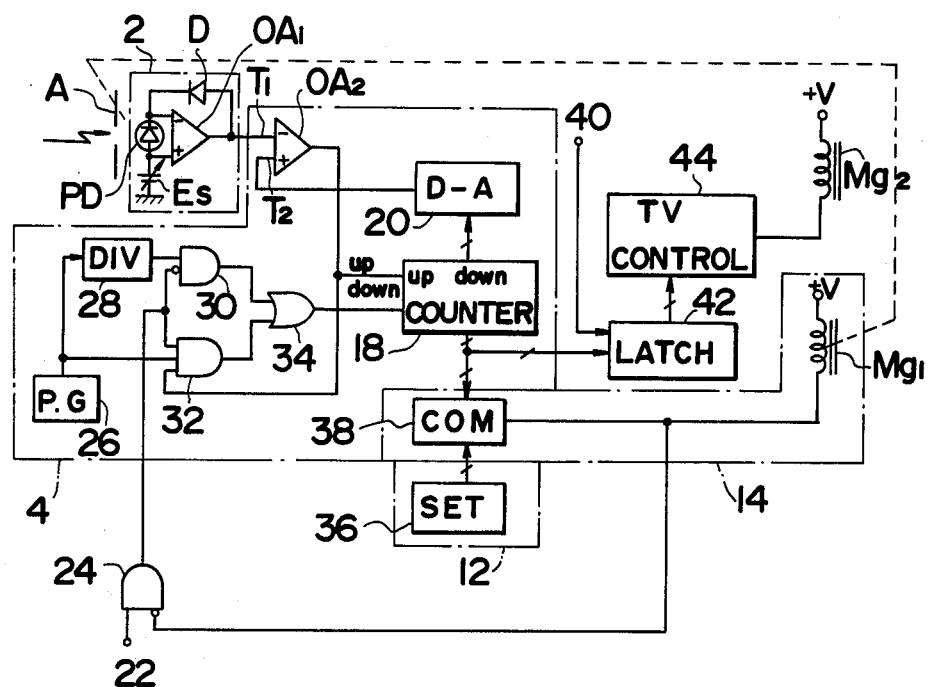
FIG. 4 shows a circuit diagrapm of a second embodiment of the present invention.
Figure 5:
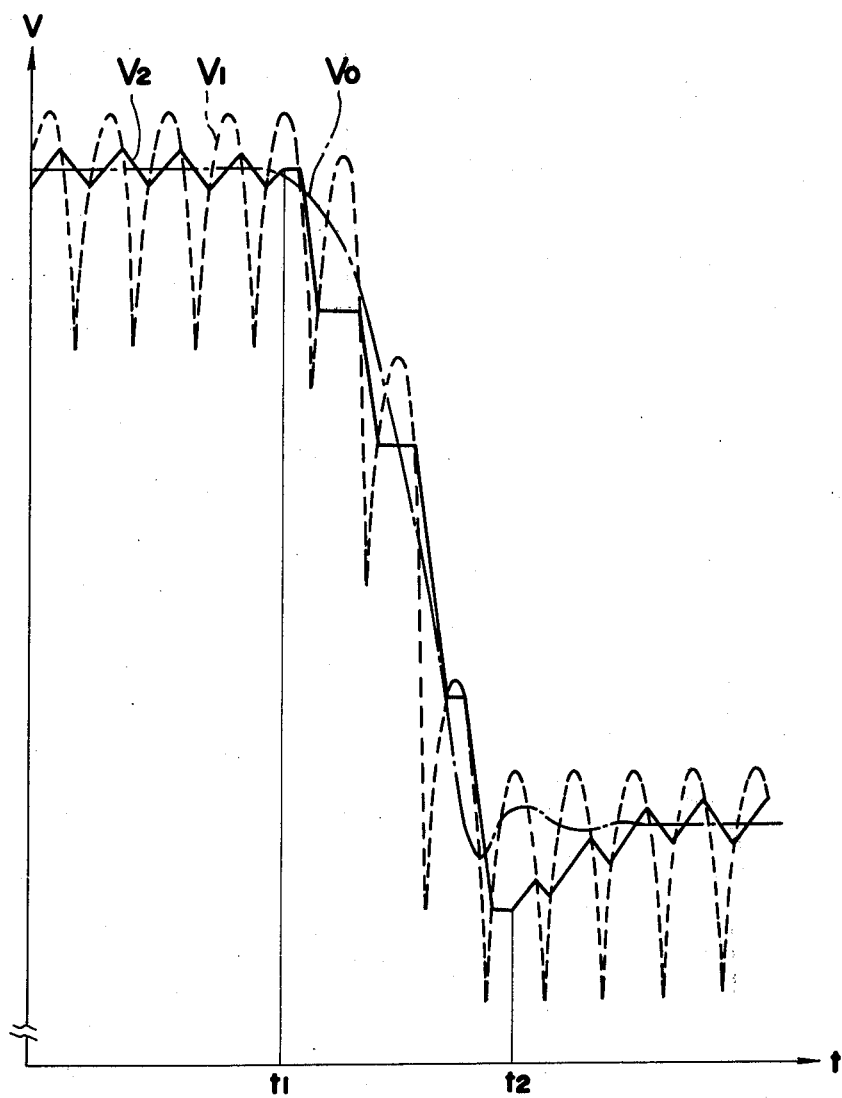
FIG. 5 shows graphically the operative functioning of the second invention embodiment shown in FIG. 4.

FIG. 4 shows a block diagram of a second embodiment of the present invention. The same reference numbers are used for members corresponding to those in FIG. 2 and the description thereof is omitted. FIG. 5 shows the relationship between output $V_1$ of the light measuring circuit and approximate signal $V_2$ in a similar manner to FIG. 3.

Approximate signal generating circuit 4 includes up-down counter 18, whose counting contents (digital signals) become an approximate signal. The counting contents are also converted by a D-A converter into analog value $V_2$ which is compared with output $V_1$ from the light measuring circuit by comparator $OA_2$. Clock pulse generator 26 sends low-frequency clock pulses through frequency divider 28 to AND gate 30 and high-frequency pulses to AND gate 32. Terminal 22, which is an input of AND circuit 24, becomes a "High" level only between times $t_1$ and $t_2$ in FIG. 5 ($t_1$ and $t_2$ in FIG. 3). Before time $t_1$, output of AND circuit 24 is at a "Low" level, causing low-frequency clock pulses alone to be sent through AND gate 30 and OR gate 34 to up-down counter 18 as an input. The up-down count control input to the counter is controlled by comparator $OA_2$, and the counter counts up when output $V_1$ of the light measuring circuit at terminal $T_1$ is larger than analog approximate signal $V_2$ at terminal $T_2$, while it counts down when the relations between $V_1$ and $V_2$ become inverse. Consequently, as shown in FIG. 5, the count contents of counter 18 (corresponding to analog value $V_2$) follow the changes in $V_1$ of the light measuring circuit at a first speed of A-D conversion prior to time $t_1$. As a result, almost a constant value is available in the vicinity of the mean value Vo of $V_1$. ($V_1$ actually changes in a stepped manner, but it should be understood that, in FIG. 5, $V_2$ is represented by the slope of its stepped change for brevity of the drawing).

Assume that the output of AND circuit 24 is at a "High" level while terminal 22 remains "High", then only high-frequency clock pulses can be sent through AND gate 32 and OR gate 34 to counter 18 between time $t_1$ and $t_2$ as shown in FIG. 5. AND gate 32, controlled by comparator $OA_2$, can pass the high frequency pulses only when the level of $V_1$ is lower than that of $V_2$. As shown in FIG. 5, the count contents of counter 18 remain unchanged between times $t_1$ and $t_2$ with $V_1 > V_2$ while rapid counting down is effected by means of high-frequency clock pulses with $V_1 < V_2$. Thus, after time $t_1$, i.e., after the initiation of the diaphragm stopping-down operation, the count contents follow the changes in $V_1$ at a second speed of A-D conversion which is faster than the first speed of A-D conversion.

It should be understood that the count contents after time $t_2$ follow $V_1$ in the same relationship as that prior to time $t_1$.

Thus, the approximate signal generating circuit in FIG. 4 is capable of A-D conversion of signals $V_1$ consisting of signals Vo which rapidly vary in one direction and include noise which have as many frequency components as the variations of signals Vo, and eliminating the noises from the signals $V_1$.

With reference signal generating circuit 12 in FIG. 4, shutter speed setting circuit 36 generates a digital signal corresponding to a set shutter speed. Digital comparator circuit 38 generates a "High" level signal when it detects that the count contents of counter 18 coincide with the digital signal from shutter speed setting circuit 36, whereby electromagnet $Mg_1$ is actuated to stop the diaphragm stopping-down operation.

It is to be noted that the "High" level signal from comparator 38 is supplied to AND circuit 24 as an input, causing the output of AND circuit 24 to be at a "low" level prior to time $t_2$. Therefore, AND circuit 24 functions in the same manner as synchronizer 8 in FIG. 2.

Memory signal terminal 40 becomes a "High" level at a predetermined time after time $t_2$, whereby a constant condition is maintained (up-down counts are repeated centering around the mean value) after a diaphragm aperture has been determined, and the count contents of counter 18 are stored in latch circuit 42. Digital exposure time control circuit 44 functions in response to the value stored in latch circuit 42 in order to control electromagnet $Mg_2$. (Since this is inferrable from FIG. 3, an illustration of the details of circuit 44 is omitted in FIG. 5.)

Figure 6:
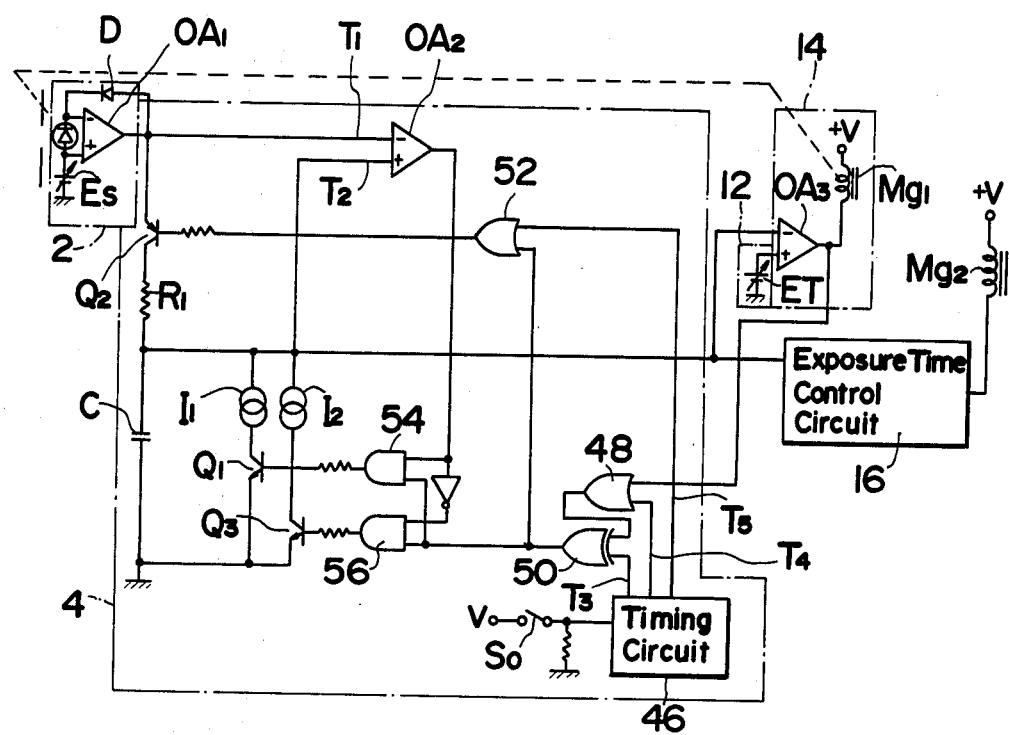
FIG. 6 shows a circuit diagram of a third embodiment of the present invention.

FIG. 6 is a circuit diagram of a third embodiment of the present invention. The same reference numbers are used for members corresponding to those in FIG. 2 and the description thereof is omitted. In addition, FIG. 7 shows the relationship between output $V_1$ of the light measuring circuit and approximate signal $V_2$, in a similar manner to FIG. 3.

The third embodiment is almost identical in construction to the first embodiment and therefore description will then be given of only the differences between them. Timing circuit 46 starts counting when switch So is closed in response to the release button depression. It should be understood that terminals $T_3$, $T_4$ and $T_5$ of timing circuit 46 are all at a "Low" level at the start of time counting. In addition, when the output of light measuring circuit 2 is higher than a set value by potential circuit ET at the fully open aperture, the output of comparator $OA_3$ is also at a "Low" level. Under this condition, therefore, the outputs or OR circuit 48, exclusive OR circuit 50 and OR circuit 52 are all at a "Low" level.

At this time, transistor $Q_2$ is turned on, allowing light measuring circuit 2 and a smoothing circuit comprising resistor $R_1$ and capacitor C to be connected to each other. Also, the outputs of AND circuits 54 and 56 are both at a "Low" level, whereby transistors $Q_1$ and $Q_3$ are turned off. As a result, the construction comprising constant-current circuits $I_1$ and $I_2$, transistors $Q_1$ and $Q_3$ and comparator $OA_2$ does not contribute to the circuit operation.

Figure 7:
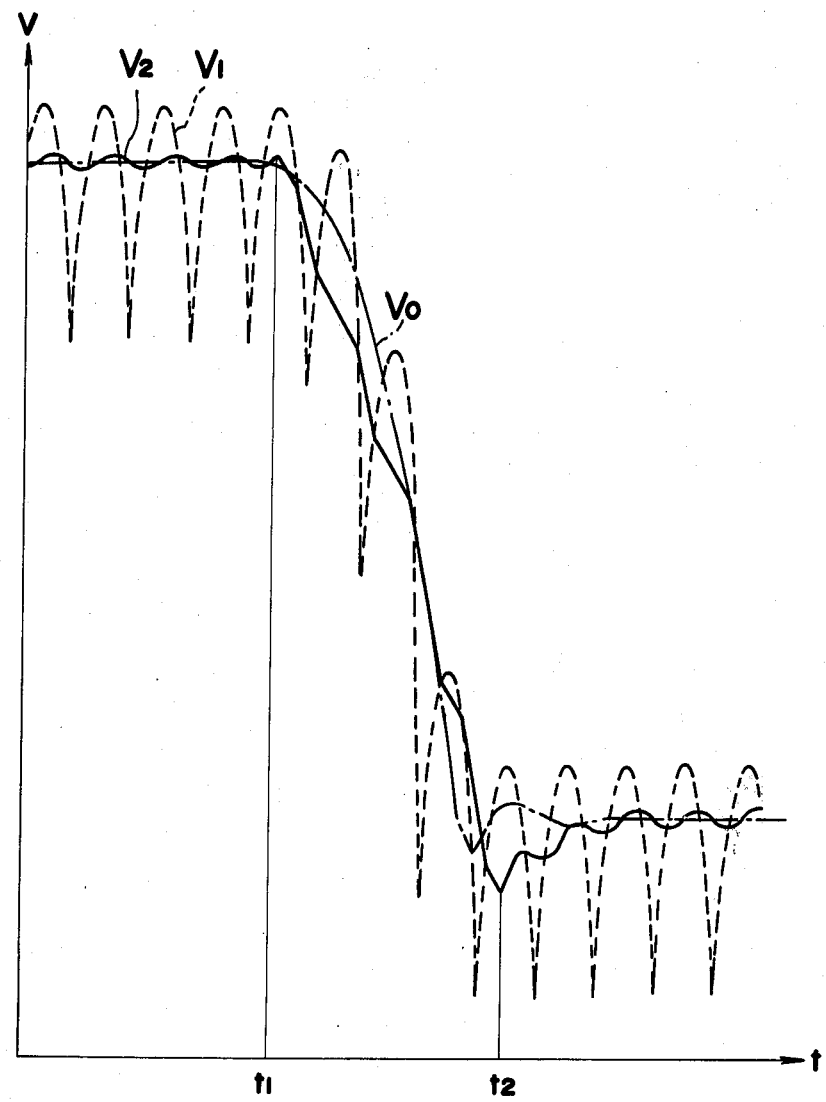
FIG. 7 shows graphically the operative functioning of the third invention embodiment shown in FIG. 6.

This condition continues until terminal $T_3$ becomes a "High" level at time $t_1$, during which period output $V_2$ of approximate signal generating circuit 4 becomes as shown in FIG. 7. This condition is identical to that until time $t_1$ in FIG. 3.

When terminal $T_3$ becomes "High" at time $t_1$, the output of exclusive OR circuit 50 will be at a "High" level, causing the gates of AND circuits 54 and 56 to be opened. Light measuring output $V_1$ and output potential $V_2$ of capacitor C are compared by comparator $OA_2$. When the output of comparator $OA_2$ is at a "High" level with light measuring output $V_1$ being lower than output potential $V_2$, transistor $Q_1$ is turned on, causing capacitor C to be comparatively rapidly discharged through constant-current circuit $I_1$. When light measuring output $V_1$ is higher than output potential $V_2$, transistor $Q_3$ is turned on, causing capacitor C to be comparatively slowly discharged through constant-current circuit $I_2$. This condition shown in FIG. 7 continues until time $t_2$.

When terminal $T_4$ becomes "High" at time $t_2$, the output of exclusive OR circuit 50 will be at a "Low" level, allowing the output of OR circuit 52 to be at a "Low" again. Therefore, resistor $R_1$ and capacitor C constitute a smoothing circuit for light measuring output, making the condition the same as that prior to time $t_1$.

Approximate signal $V_2$ thus generated is compared with a set level by potential source ET in comparator $OA_3$. It should be understood that the output of comparator $OA_3$ is also supplied to OR circuit 48, and when the diaphragm stopping-down operation is suspended under the action of electromagnet $Mg_1$ with the output of comparator $OA_3$ at a "High" level, the outputs of exclusive OR circuit 50 and OR circuit 52 become "Low", whereby transistor $Q_2$ is turned on, and transistors $Q_1$ and $Q_3$ are turned off prior to time $t_2$. It is also to be understood that electric power supply to comparator $OA_3$ is effected in synchronism with closing of switch So.

Terminal $T_5$ of timing circuit 46 is a memory signal terminal which becomes "High" as timely as time $t_4$ in FIG. 4. This causes transistor $Q_2$ to be turned off, thereby the voltage of capacitor C to be fixed.

Figure 8:
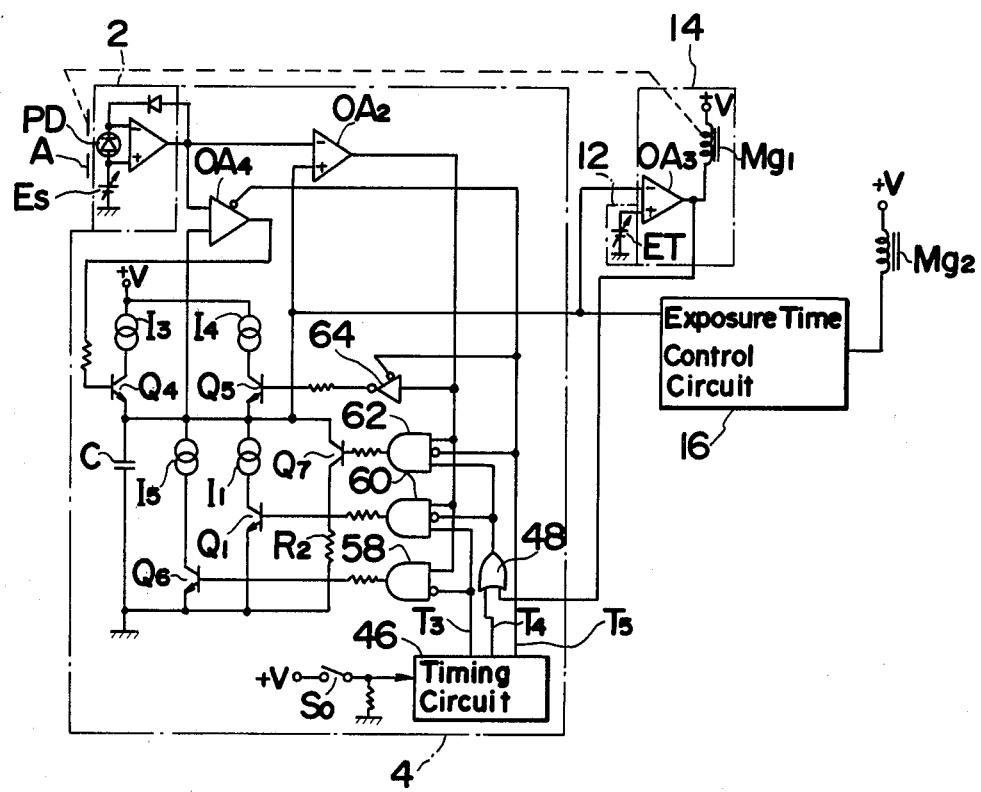
FIG. 8 shows a circuit diagram of a fourth embodiment of the present invention.
Figure 9:
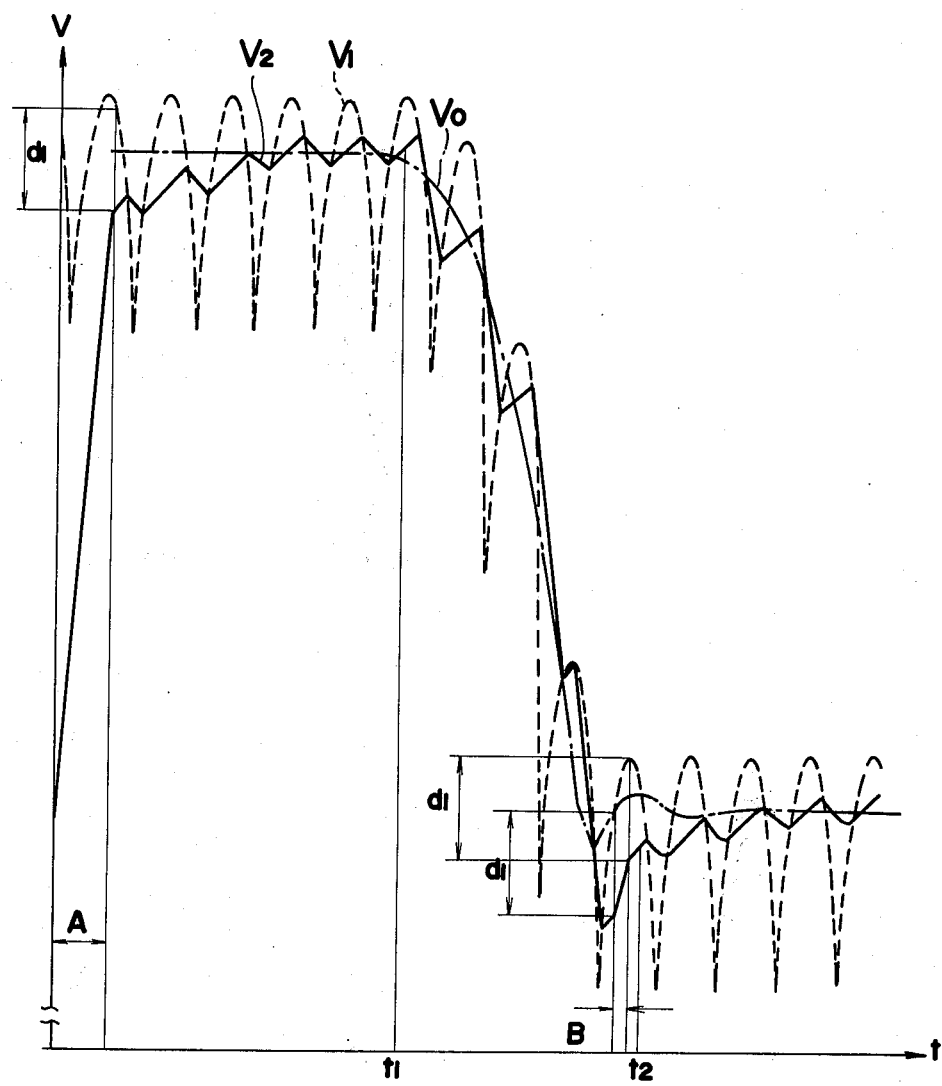
FIG. 9 shows graphically the operative functioning of the fourth invention embodiment shown in FIG. 8.

FIG. 8 shows a fourth embodiment of the present invention, wherein the same reference numbers are used for members corresponding to those in FIG. 6. Also, FIG. 9 shows the relationship between output $V_1$ of light measuring circuit 2 and approximate signal $V_2$ in a similar manner to FIG. 3.

With approximate signal generating circuit 4 in FIG. 8, comparator $OA_4$ is provided with an offset between an inverted input and a non-inverted input, and its output is inverted when the non-inverted input potential is higher than the inverted input potential by a given level. In addition, comparator $OA_4$ becomes inoperative when terminal $T_5$ from timing circuit 46 becomes "High", thereby respresenting a high impedance. Comparator $OA_2$ is of the ordinary type used in other embodiments. Constant-current circuits $I_3$ and $I_4$ are used to charge capacitor C, while constant-current circuits $I_1$ and $I_5$ are used to discharge capacitor C. Resistor $R_2$ is used to discharge capacitor C. AND circuits are labeled 58, 60 and 62. Inverter circuit 64 becomes inoperative when a signal from terminal 14 of timing circuit 46 is at a "High" level, thereby representing a high impedance. Timing circuit 46 starts time counting upon receipt of a signal of switch So being closed in response to the release button depression in a similar manner to FIG. 6, causing terminals $T_3$, $T_4$ and $T_5$ to sequentially become "High".

Potential source ET generates a potential corresponding to a predetermined exposure time, e.g., a potential corresponding to an exposure time determined by light measuring output at the fully open aperture and a program constant or potential corresponding to a determined exposure time based on light measuring output at the fully open aperture and a preset diaphragm aperture or a potential corresponding to a set exposure time. Comparator $OA_3$ controls a diaphragm aperture and electromagnet $Mg_1$ stops the diaphragm. When the output of comparator $OA_3$ becomes a "Low" to "High" level, electromagnet $Mg_1$ is turned from energized condition to de-energized condition to stop the diaphragm stopping-down operation. This operation is identical to that in other embodiments.

Description will now be given of the operation of the embodiment shown in FIG. 8. When switch So is closed, all of the outputs of timing circuit 46 are at a "Low" level. When, at this time, the output potential of capacitor C is lower than a light measuring output by more than a given level ($d_1$ in FIG. 9), the output of comparator $OA_4$ becomes a "High" level, causing transistor $Q_4$ to be turned on, and thereby capacitor C is rapidly charged with a current from constant-current circuit $I_3$.

The output of comparator $OA_2$ at this time, is at a "Low" level, causing transistor $Q_5$ to be turned on, whereby capacitor C is charged also with a current from constant-current circuit $I_4$. This condition corresponds to section a in FIG. 9. Rapid charging by constant-current circuit $I_3$ is so designed that the voltage of capacitor C can rapidly follow the output of a light measuring circuit after a power switch of a camera (not shown) is turned on. When the output potential of capacitor C becomes lower than light measuring output $V_1$ by a given level, the output of comparator $OA_4$ becomes "Low", causing transistor $Q_4$ to be turned off. Since the output of comparator $OA_2$ at this time is still at a "Low" level, constant-current circuit $I_4$ continues comparatively slow charging to capacitor C. When the output potential $V_2$ of capacitor C coincides with light measuring output $V_1$, the output of comparator $OA_2$ is inverted to become "High", turning transistor $Q_5$ off, and turning transistor $Q_6$ on, whereby constant-current circuit $I_5$ performs comparatively slow discharging. Terminals $T_3$, $T_4$ and $T_5$, at this time, are still at a "Low" level, AND circuit 58 along being functional. Hereafter, charging and discharging are performed by constant-current circuits $I_4$ and $I_5$ based on the output of comparator $OA_2$, whereby $V_1$ is averaged and obtained as output $V_2$. This condition continues until time $t_1$ in FIG. 9.

The period for terminal $T_3$ to become "High" up to time $t_1$ is almost equal to that for the diaphragm stopping-down operation started upon depression of the release button. When terminal $T_3$ becomes a "High" level, the gate of AND circuit 58 is closed, while the gate of AND circuit 60 is opened. Hereafter, charging and discharging are repeated by constant-current circuits $I_4$ and $I_1$ based on the output of comparator $OA_2$ as shown in FIG. 9. Constant-current circuit $I_1$ is of the rapid discharge type used in other embodiments.

Terminal $T_4$ becomes "High" at time $t_2$ after the lapse of a predetermined time following the initiation of the diaphragm stopping-down operation. This period is longer than that required for the diaphragm to be stopped-down from its fully open aperture to its minimum aperture. When terminal $T_4$ becomes "High", the gate of AND circuit 60 is closed, and the gate of AND circuit 62 is opened, and transistor $Q_7$ is controlled for on and off operations when the output of comparator $OA_2$ becomes "High" and "Low". Therefore, charging and discharging are performed hereafter by constant-current circuit $I_4$ and resistor $R_2$. The waveform obtained at this time is more approximate to a signal smoothed from light measuring output $V_1$. It should be noted that constant-current circuit $I_3$ functions to rapidly charge capacitor C when it is excessively discharged as evidenced in section B in FIG. 9.

Next, terminal $T_5$ becomes "High" simultaneously when a reflecting mirror is started to lift, causing the gate of AND circuit 62 to be closed, while rendering inverter circuit 64 and comparator $OA_4$ inoperative, whereby output potential of capacitor C is fixed at a value coincident with light measuring output $V_1$. Based on the output potential of capacitor C, the time at which the second curtain starts traveling is controlled by exposure time control circuit 16 and electromagnet $Mg_2$.

With the present invention, capacitor C is charged and discharged on the basis of light measuring output $V_1$ before the diaphragm starts to be stopped down.

Without such charge and discharge of capacitor C, when a light measuring output is made extremely small by a fluorescent light component when the diaphragm starts to be stopped down, the diaphragm stopping-down is stopped at the fully open aperture. It is to be understood that if comparator $OA_3$ is designed to remain inoperative before terminal $T_3$ becomes "High", charge and discharge of capacitor C will not be required until terminal $T_3$ becomes "High". Furthermore, the constant-current circuitries for charging or discharging capacitor C are replaceable with resistors.

Figure 10:
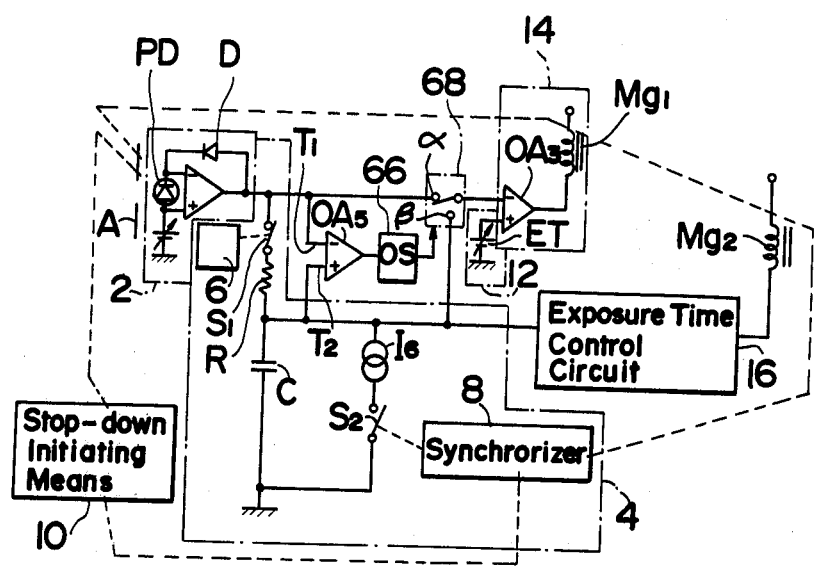
FIG. 10 shows a circuit diagram of a fifth embodiment of the present invention.

FIG. 10 shows a fifth embodiment of the present invention. The same reference numbers are used for members corresponding to the first embodiment. In addition, FIG. 11 shows a relationship between light measuring output $V_1$ and approximate signal $V_2$ in a similar manner to FIG. 3.

Figure 11:
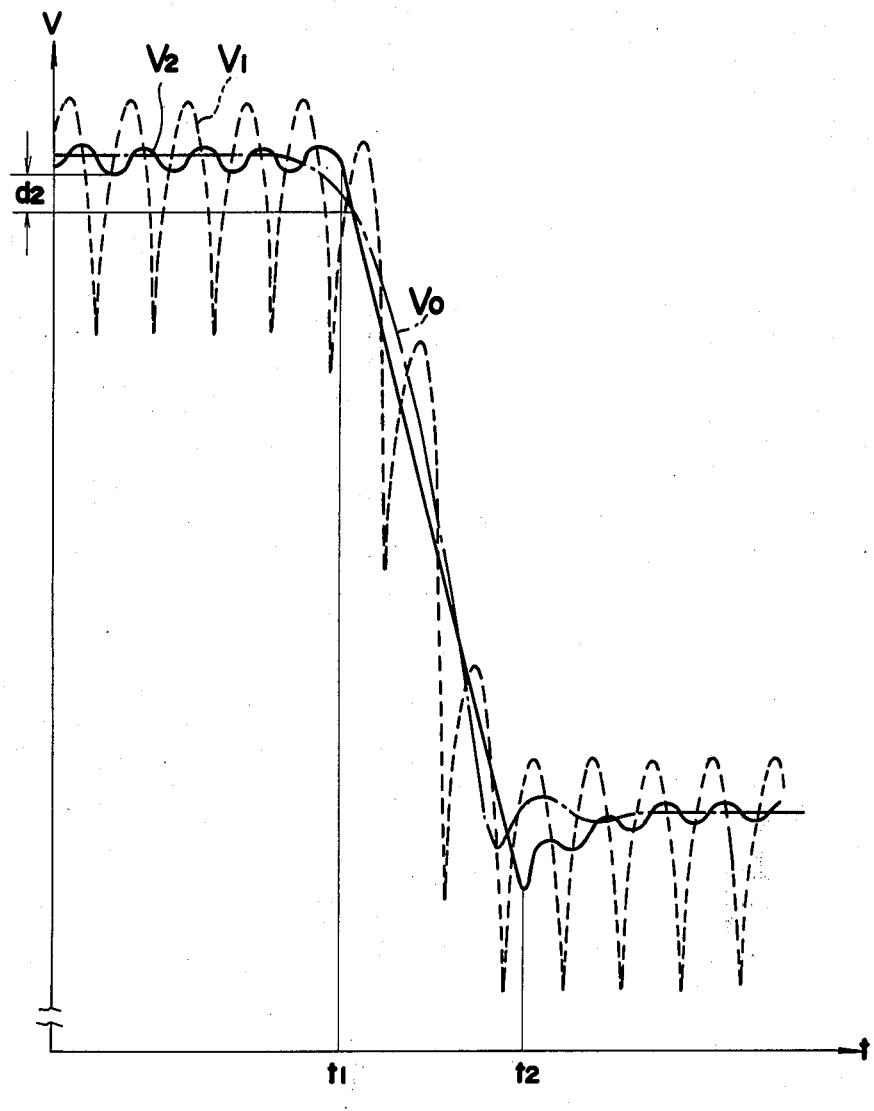
FIG. 11 shows graphically the operative functioning of the fourth invention embodiment shown in FIG. 10.

With reference to FIG. 10, constant-current circuit $I_6$ is so designed that it discharges capacitor C at a slant approximate to that of diaphragm aperture change $V_0$, as is clear from FIG. 11. Therefore, capacitor C is continuously discharged by constant-current circuit $I_6$ in parallel to the diaphragm stopping-down operation for a period from the closure of synchronizing switch $S_2$ at time $t_1$ in FIG. 9 until its opening at time $t_2$ or time $t_3$ in FIG. 3. The approximate signal level at the start time of rapid discharge (an initial value of a change in approximate signal) is determined by the output of light measuring circuit 2. This causes approximate signals between times $t_1$ and $t_2$ in FIG. 11 to be shifted vertically and horizontally in parallel according to scene brightness.

It is to be noted that with reference to FIG. 10, comparator $OA_5$ has an offset provided between an inverted input and a non-inverted input, whereby a relationship of output $T_2$ being larger than output $T_1$ by a given level or more ($d_2$ in FIG. 11) causes the output to become "High". One-shot circuit 66 generates a "High" output signal for a specified period of time in response to a "High" signal from comparator $OA_5$, thereby changing electronic switch 68 from $\alpha$ side to $\beta$ side only for that period. The specified period of time in one-shot circuit 66 is made longer than that required for the diaphragm to be stopped-down from its fully open aperture to its minimum aperture.

Therefore, if the brightness of a scene contains a variation component more than a predetermined value before diaphragm stopping-down operation, there always occurs a condition in which $V_2$ is larger than $V_2$ by $d_2$ or more immediately before the diaphragm stopping-down operation starts. One-shot circuit 66 maintains hereafter electronic switch 68 at $\beta$ side for a predetermined period of time, whereby the determination of a diaphragm aperture is made by approximate signal $V_2$ and a reference signal set by potential source ET.

On the other hand, when scene brightness contains no variation component, electronic switch 68 is maintained at $\alpha$ side, whereby the determination of a diaphragm aperture is made by light measuring output $V_1$ and a reference signal.

It should be noted that a modification of the embodiment in FIG. 10 is possible wherein one-shot circuit 66 may be eliminated and electronic switch 68 may be controlled directly by the output of comparator $OA_5$. In this case, a changeover of electronic switch 68 occurs during diaphragm stopping-down operation. As a result, when light measuring signal $V_1$ is larger than approximate signal $V_2$ or when it is smaller than $V_2$ by less than a predetermined level ($d_2$ in FIG. 11), light measuring signal $V_1$ and reference signal $V_2$ are compared by comparator $OA_3$. In contrast, when there occurs a case in which $V_1$ is smaller than $V_2$ beyond the predetermined level, approximate signal $V_2$ and a reference signal are compared by comparator $OA_3$. Thus, the premature stop of diaphragm stopping-down operation may be prevented from occurring due to trough portions of the AC components included in light measuring signal $V_1$.

I claim:

1. A diaphragm control device for a camera which includes a diaphragm forming a diaphragm aperture and which is capable of a stopping-down operation and a means for initiating the stopping-down operation of said diaphragm, said control device comprising:

a light measuring circuit for generating a light measurement signal commensurate with the scene brightness measured through said diaphragm aperture, said light measurement signal including fluctuation components when timewise variations are involved in the scene brightness and which varies with the change in said diaphragm aperture due to the stopping-down operation of said diaphragm;

an approximate signal-generating circuit for generating, on the basis of said light measurement signal, an approximate signal which varies approximately with the change in said diaphragm aperture due to the stopping-down operation of said diaphragm and which coincides with said light measurement signal when no fluctuation components are included in said light measurement signal;

means for generating a reference signal; and stopping-down operation stopping means for stopping the stopping-down operation of said diaphragm when said approximate signal represents a given relationship with respect to said reference signal.

2. A diaphragm control device as defined in claim 1, wherein said approximate signal generating circuit includes:

means for generating a following signal which follows said light measurement signal with a certain delay;

means for controlling the following speed of said following signal by comparing said following signal with said light measurement signal such that the following signal varies more approximately to the change in the diaphragm aperture than said light measurement signal does; and a synchronizer for rendering said control means operative in synchronism with the initiation of the stopping-down operation of said diaphragm, whereby said following signal is said approximate signal.

3. A diaphragm control device as defined in claim 2, wherein said following signal-generating means includes capacitance means connected to said light-measuring circuit so as to be charged in accordance with said light measurement signal with a certain delay, and wherein said control means includes a comparator for comparing the output potential of said capacitance means with the potential of said light measurement signal, and discharging means actuated by said synchronizer for rapidly discharging said capacitance means only when the comparison by said comparator indicates that the output potential of said capacitance means represents a given relationship with respect to the potential of said light measurement signal, whereby said output potential of said capacitance means is said following signal.

4. A diaphragm control device as defined in claim 3, wherein said following signal-generating means includes a smoothing circuit connected to said light-measuring circuit and includes said capacitance means as its capacitance element, whereby the output potential of said capacitance means corresponds to said light measurement signal smoothed by said smoothing circuit until said control means is rendered operative.

5. A diaphragm control device as defined in claim 3, wherein said discharging means includes a first and second discharging circuit for discharging said capacitance means at different speeds, said first discharging circuit being made actuatable when the comparison by said comparator indicates that said output potential of said capacitance means is at a first side with respect to said potential of said light measuring signal while said second discharging circuit is made actuatable when the comparison by said comparator indicates that said output potential of said capacitance means is at a second side opposite to said first side with respect to said potential of said light measurement signal.

6. A diaphragm control device as defined in claim 1, wherein said approximate signal generating circuit includes capacitance means whose output potential is said approximate signal, a comparator for comparing the output potential of said capacitance means with the output of said light measurement signal, first charging means for charging said capacitance means at a comparatively low speed, first discharging means for discharging said capacitance means at a comparatively high speed, and a control circuit for selectively and alternatively actuating said first charging means and discharging means each time said comparator detects the level inversion of the output potential of said capacitance means with respect to the potential of said light measurement signal.

7. A diaphragm control device as defined in claim 6, further comprising second charging means for charging said capacitance means at a high speed, and means for stopping the operation of said second charging means when the output potential of said capacitance means reaches a potential which is a given level lower than the potential of said light measurement signal.

8. A diaphragm control device as defined in claim 7, wherein said approximate signal generating circuit further includes a timer circuit for generating a synchronizing signal in synchronism with the initiation of the stopping-down operation of said diaphragm, and wherein said control circuit includes first circuit means connected to said comparator for actuating said first charging means when the output potential of said capacitance means is at a first side with respect to the potential of said light measurement signal and second circuit means connected to both said comparator and said timer circuit for actuating said first discharging circuit in resonse to said synchronizing signal when the output potential of said capacitance means is at a second side opposite to said first side with respect to the potential of said light measurement signal.

9. A diaphragm control device as defined in claim 8, wherein said approximate signal generating circuit further includes second discharging circuit for discharging said capacitance means at a comparatively low speed and third circuit means for actuating said second discharging means until said timer circuit generates said synchronizing signal when the output of said capacitance means is at said second side with respect to the potential of said light measurement signal.

10. A diaphragm control device as defined in claim 1, wherein said approximate signal generating circuit includes:

an A-D convertor for generating a digital signal which follows said light measurement signal, said digital signal being said approximate signal;

control means for increasing the A-D conversion speed of said A-D converter only when said digital signal represents a given relationship with respect to said light measurement signal; and a synchronizer for rendering said control means operative in synchronism with the initiation of the stopping-down operation of said diaphragm.

11. A diaphragm control device as defined in claim 1, wherein said approximate signal generating circuit includes:

following signal generating means for generating a following signal which follows said light measurement signal with a certain delay; and means for changing said following signal generated at the time of the initiation of the stopping-down operation of said diaphragm, at a given speed which is approximate to the inclination of the change in the diaphragm aperture; and means for rendering said following signal changing means operative in synchronizm with the initiation of the stopping-down operation of said diaphragm, whereby said following signal changed by said following signal changing means is said approximate signal.

12. A camera comprising:

a diaphragm forming a diaphragm aperture and capable of stopping-down operation:

means for initiating the stopping-down operation of said diaphragm;

a light measuring circuit for generating a light measurement signal commensurate with the scene brightness measured through said diaphragm aperture, said light measurement signal including fluctuation components when timewise variations are involved in the scene brightness and varying with the change in said diaphragm aperture due to the stopping-down operation of said diaphragm;

an approximate signal generating circuit for generating, on the basis of said light measurement signal, an approximate signal which varies approximately with the change in said diaphragm aperture due to the stopping-down operation of said diaphragm and which coincides with said light measurement signal when no fluctuation components are involved in said light measurement signal;

means for generating a reference signal;

stopping-down operation stopping means for stopping the stopping-down operation of said diaphragm when said approximate signal represents a given relationship with respect to said reference signal;

means for latching said approximate signal in response to the actuation of said stopping-down operation stopping means; and means for controlling an exposure time in accordance with said approximate signal latched by said latching means.

* * * * *